United States Patent
Ji et al.

(10) Patent No.: US 9,681,356 B2
(45) Date of Patent: *Jun. 13, 2017

(54) DATA FORWARDING IN HYBRID MESH NETWORKS

(71) Applicant: AT&T INTELLECTUAL PROPERTY I, L.P., Atlanta, GA (US)

(72) Inventors: Lusheng Ji, Randolph, NJ (US); David M. Britz, Rumson, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,825

(22) Filed: Aug. 5, 2016

(65) Prior Publication Data

US 2016/0345235 A1    Nov. 24, 2016

Related U.S. Application Data

(63) Continuation of application No. 14/713,444, filed on May 15, 2015, now Pat. No. 9,432,876, which is a
(Continued)

(51) Int. Cl.
| | |
|---|---|
| *H04L 12/715* | (2013.01) |
| *H04W 40/02* | (2009.01) |
| *H04H 60/56* | (2008.01) |
| *H04L 12/58* | (2006.01) |
| *H04L 29/08* | (2006.01) |
| *H04L 12/701* | (2013.01) |

(Continued)

(52) U.S. Cl.
CPC ............ *H04W 40/02* (2013.01); *H04H 60/56* (2013.01); *H04L 1/004* (2013.01); *H04L 29/08459* (2013.01); *H04L 45/00* (2013.01); *H04L 45/128* (2013.01); *H04L 45/20* (2013.01); *H04L 45/24* (2013.01); *H04L 45/26* (2013.01); *H04L 45/42* (2013.01); *H04L 45/64* (2013.01); *H04L 45/74* (2013.01); *H04L 51/12* (2013.01); *H04W 28/04* (2013.01); *H04W 40/04* (2013.01); *H04W 40/12* (2013.01); *H04L 47/801* (2013.01); *H04L 49/208* (2013.01); *H04W 84/18* (2013.01)

(58) Field of Classification Search
CPC ... H04L 29/08459; H04L 45/64; H04W 84/18
See application file for complete search history.

(56) References Cited

U.S. PATENT DOCUMENTS

| | | |
|---|---|---|
| 6,611,526 B1 | 8/2003 | Chinnaswamy et al. |
| 6,611,872 B1 | 8/2003 | McCanne |

(Continued)

*Primary Examiner* — Andrew Chriss
*Assistant Examiner* — Salvador E Rivas
(74) *Attorney, Agent, or Firm* — Hoffmann & Baron, LLP (57) ABSTRACT

A system and method are disclosed for forwarding data in hybrid wireless mesh networks. The method includes configuring a number of mesh network nodes as potential relay nodes (PRNs) in an overlay network associated with a hybrid wireless mesh network, streaming data packets from a source node to a destination node using a native data forwarding algorithm of the hybrid wireless mesh network, dynamically identifying relay nodes (RNs) among PRNs in the overlay network, creating secondary paths for sending data packets towards selected RNs in the overlay network, and relaying data packets from RNs to the destination node using the overlay network.

20 Claims, 3 Drawing Sheets

Related U.S. Application Data continuation of application No. 13/757,283, filed on Feb. 1, 2013, now Pat. No. 9,055,508, which is a continuation of application No. 11/901,766, filed on Sep. 19, 2007, now Pat. No. 8,385,345.

(51) Int. Cl.

| | | |
|---|---|---|
| *H04L 12/735* | (2013.01) | |
| *H04L 12/733* | (2013.01) | |
| *H04L 12/707* | (2013.01) | |
| *H04L 12/721* | (2013.01) | |
| *H04L 12/717* | (2013.01) | |
| *H04W 40/04* | (2009.01) | |
| *H04W 40/12* | (2009.01) | |
| *H04L 1/00* | (2006.01) | |
| *H04W 28/04* | (2009.01) | |
| *H04L 12/741* | (2013.01) | |
| *H04L 12/931* | (2013.01) | |
| *H04L 12/927* | (2013.01) | |
| *H04W 84/18* | (2009.01) | |

(56) References Cited

U.S. PATENT DOCUMENTS

| | | | |
|---|---|---|---|
| 6,778,502 B2 * | 8/2004 | Ricciulli | F25B 41/003 370/238 |
| 7,133,928 B2 | 11/2006 | McCanne | |
| 8,385,345 B2 | 2/2013 | Ji et al. | |
| 9,055,508 B2 * | 6/2015 | Ji | H04L 45/00 |
| 2005/0135399 A1 | 6/2005 | Baden et al. | |
| 2006/0050697 A1 * | 3/2006 | Li | H04L 29/06027 370/389 |
| 2006/0098607 A1 | 5/2006 | Zeng et al. | |
| 2006/0146730 A1 | 7/2006 | Zeng et al. | |
| 2006/0259617 A1 | 11/2006 | Lee | |
| 2006/0285529 A1 | 12/2006 | Hares et al. | |
| 2007/0070959 A1 | 3/2007 | Almeroth et al. | |
| 2007/0248086 A1 * | 10/2007 | Petersen | H04L 49/15 370/389 |
| 2008/0002733 A1 | 1/2008 | Sutskover | |
| 2008/0095193 A1 * | 4/2008 | Gaedke | H04L 47/10 370/473 |

* cited by examiner

DATA FORWARDING IN HYBRID MESH NETWORKS

CROSS-REFERENCE TO RELATED APPLICATIONS

This application is a continuation of U.S. application Ser. No. 14/713,444, filed May 15, 2015, which is a continuation of U.S. application Ser. No. 13/757,283, filed Feb. 1, 2013, now U.S. Pat. No. 9,055,508, which is a continuation of U.S. application Ser. No. 11/901,766, filed Sep. 19, 2007, now U.S. Pat. No. 8,385,345, which are incorporated by reference herein in their entireties.

BACKGROUND

Field

The disclosed embodiments generally relate to forwarding packet data from a source node to a destination node, and more particularly to forwarding data in hybrid mesh networks that incorporate multiple wireless technologies.

Brief Description of the Related Art

A wireless mesh network (WMN) is a wireless communication system that provides for the communication of packet data across multiple hops to anywhere in the network using a store-and-forward mechanism. WMNs typically include a plurality of nodes in which each node capable of communicating with at least one other node. In some instances, WMNs are implemented as a fixed wireless access (FWA) system capable of communicating broadband data between fixed-site communication stations which form the nodes.

Mesh networks allow for continuous connections and reconfiguration around broken or blocked data paths by 'hopping' from node to node until a destination node is reached. Different from the traditional spanning tree based forwarding approach, which essentially shuts down redundant links in networks, mesh networking actively uses redundant links in the network to achieve better network robustness and performance.

In Hybrid Wireless Mesh Networks (HMNs), the same network includes links of communication technologies that have very different characteristics. For example, HMNs can include various wireless communication technologies, such as Wireless LAN, Zigbee, Bluetooth, FreeSpace Optics, etc. Typically, HMNs have better network robustness and availability than WMNs in that factors that may affect one communication technology have little effect on other communication technologies. For example, in HMNs that combine both radio links and Free Space Optics Communication (FSOC) links, radio interference tends to negatively affect the radio links but has little or no effect on the FSOC links. Alternatively, fog is a common problem for FSOC links but typically does not reduce radio link communication quality.

Current data forwarding algorithms used in conventional HMNs are essentially single path forwarding algorithms that usually do not consider individual network link capacity and load. Typically, if a communication failure occurs between links, the data stream is interrupted until the algorithm finds an alternative path. In addition, nodes with multiple links of different technologies do not aggregate link bandwidths. Furthermore, being single path forwarding, current algorithms do not take advantage of the technology diversity offered by multiple link technologies.

As such, there exists a need for a multi-path forwarding technique for HMNs that factors in link technology diversity, capacity and load.

SUMMARY

A system and method are disclosed for forwarding data in hybrid wireless mesh networks. The method includes configuring a number of mesh network nodes as potential relay nodes (PRNs) in an overlay network associated with a hybrid wireless mesh network, streaming data packets from a source node to a destination node using a native data forwarding algorithm of the hybrid wireless mesh network, dynamically identifying relay nodes (RNs) among PRNs in the overlay network, creating secondary paths for sending data packets towards selected RNs in the overlay network, and relaying data packets from RNs to the destination node using the overlay network.

In some implementations, the methods include measuring the quality of the secondary paths and terminating underperforming paths. The methods also include dynamically identifying new RNs and identifying new secondary paths anchored at the new RNs if overall streaming performance unsatisfactory.

Preferably, each path includes two segments, one segment from source to relay node and another segment from relay node to destination node. It will be appreciated by one skilled in the art that such a segmenting scheme can be used in a recursive fashion. That is, each segment can be further divided into two sub-segments such that instead of sending traffic directly from one end of the segment to the other end of the segment, a RN is used for anchor traffic flow for this segment.

Various aspects of the disclosed embodiments relate to streaming data packets and identifying relay nodes. For example, according to one aspect, a method of forwarding data in a hybrid wireless mesh network includes transmitting data packets along a first path from a source node to a destination node in the hybrid wireless mesh network, selecting at least one potential relay node in an overlay network associated with the hybrid wireless mesh network, the selected potential relay network being adapted to provide a second path for transmission of data packets between the source node and the destination nodes, and transmitting data packets along the second path from the source node through the at least one potential relay node to the destination node.

In one preferred embodiment, the method also includes comparing a value of a forwarding quality characteristic associated with the second path to a predetermined value, and identifying a third path for transmission of at least a portion of the data packets based on the comparison.

Preferably, the potential relay node is at least one of a dedicated node connected to the hybrid wireless mesh network and a mesh node configured as the potential relay node.

In one preferred embodiment, selecting the at least one potential relay node includes identifying the potential relay node using a centralized directory server, the centralized directory server maintaining a list of potential relay nodes associated with the hybrid wireless mesh network. In another preferred embodiment, selecting the at least one potential relay node includes broadcasting a first message from at least one of the source node and a potential relay node to a plurality of network nodes, the first message comprising a Time-to-Live (TTL) value, the TTL value representing a quantity of allowable transmissions of the first message to the plurality of network nodes. The method also includes exchanging a second message between at least one of the source node and potential relay node and the plurality of network nodes, the second message including an acknowledgement of the first message.

In one preferred embodiment, the method includes partitioning the data packets into data blocks, tagging the data blocks with sequential identifiers, transmitting the tagged data blocks to the destination node and merging the tagged data blocks in sequence at the destination node. In another preferred embodiment, the method includes partitioning a first set of data packets into data blocks, duplicating the data blocks into first and second sets of data blocks, transmitting the first and second sets of data bocks to the destination node, dropping the second set of data blocks at the destination node, and merging the first set of data blocks into a second set of data packets at the destination node. In yet another embodiment, the method includes partitioning the data packets into a first set of tagged data blocks, forming a second set of data blocks by merging information from the first set of data blocks into the second set of data blocks, transmitting the first and second sets of data blocks to the destination node, and comparing the second set of data blocks with the first set of data blocks at the destination node.

Preferably, the method also includes comparing a value of a forwarding quality characteristic associated with the second path to a predetermined value, and deactivating the second path based on the comparison. The method can also include transmitting the data packets using packet level forward error correction.

In another aspect, a networked communication system includes a source node operatively coupled to a hybrid wireless mesh network, a destination node operatively coupled to the hybrid wireless mesh network, and an overlay network associated with the hybrid wireless mesh network. The overlay network includes at least one potential relay node operatively coupled to the hybrid wireless mesh network, wherein data packets are transmitted along a first path from the source node to the destination node in the hybrid wireless mesh network, and wherein data packets are transmitted along a second path from the source node through the at least one potential relay node to the destination node.

In one preferred embodiment, the source node compares a value of a forwarding quality characteristic associated with the second path to a predetermined value, and identifies a third path for transmission of at least a portion of the data packets based on said comparison.

Preferably, the potential relay node is at least one of a dedicated node connected to the hybrid wireless mesh network and a mesh node configured as the potential relay node. In one preferred embodiment, the source node identifies a potential relay node using a centralized directory server, the centralized directory server maintaining a list of potential relay nodes associated with the hybrid wireless mesh network.

Preferably, either the source node or relay node, or both, broadcasts a first message to a plurality of network nodes, the first message comprising a Time-to-Live (TTL) value, the TTL value representing a quantity of allowable transmissions of the first message to the plurality of network nodes, and exchanges a second message with the plurality of network nodes, the second message including an acknowledgement of the first message.

In one preferred embodiment, the source node partitions the data packets into data blocks, tags the data blocks with sequential identifiers, transmits the tagged data blocks to the destination node, the destination node merging the tagged data blocks in sequence. In another preferred embodiment, the source node partitions a first set of data packets into data blocks, duplicates the data blocks into first and second data blocks, transmits the first and second sets of data blocks to the destination node, the destination node dropping the second set of data blocks and merging the first set of data blocks into second data packets. In another preferred embodiment, the source node partitions the data stream into a first set of data blocks, tags each of the first set of data blocks with sequential identifiers, forms a second set of data blocks by merging information from each of the first set of data blocks, transmits the first and second sets of data blocks to the destination node, the destination node comparing the second set of data blocks with the first set of data blocks.

In one preferred embodiment, the source node deactivates said second path. Preferably, the source node transmits the data packets and a portion of the data packets using forward error correction.

In some embodiments, one or more of the following advantages may be present. By introducing relay nodes into the Wireless Mesh Networks, multi-path forwarding can be achieved without complicating the basic data forwarding algorithm.

A further benefit relates to enhanced data path control. For example, using the disclosed embodiments, a forwarding path can be created only going over a special region or sub-domain of the WMN so that the created path utilizes links in that special region or sub-domain. This can be done by simply activating one or more relay nodes residing in the sub-domain. Hence, forwarding paths comprising links of particular technology can be constructed.

As such, the disclosed embodiments can provide data forwarding using link technology diversity along with aggregated link capacity. Furthermore, the service quality of mesh access networks can be greatly improved.

Other objects and features of the disclosed embodiments will become apparent from the following detailed description considered in conjunction with the accompanying drawings. It is to be understood, however, that the drawings are designed as an illustration only and not as a definition of the limits of the disclosed embodiments.

BRIEF DESCRIPTION OF THE DRAWINGS

Like reference symbols in the various drawings indicate like elements.

DETAIL DESCRIPTION

Figure 1:
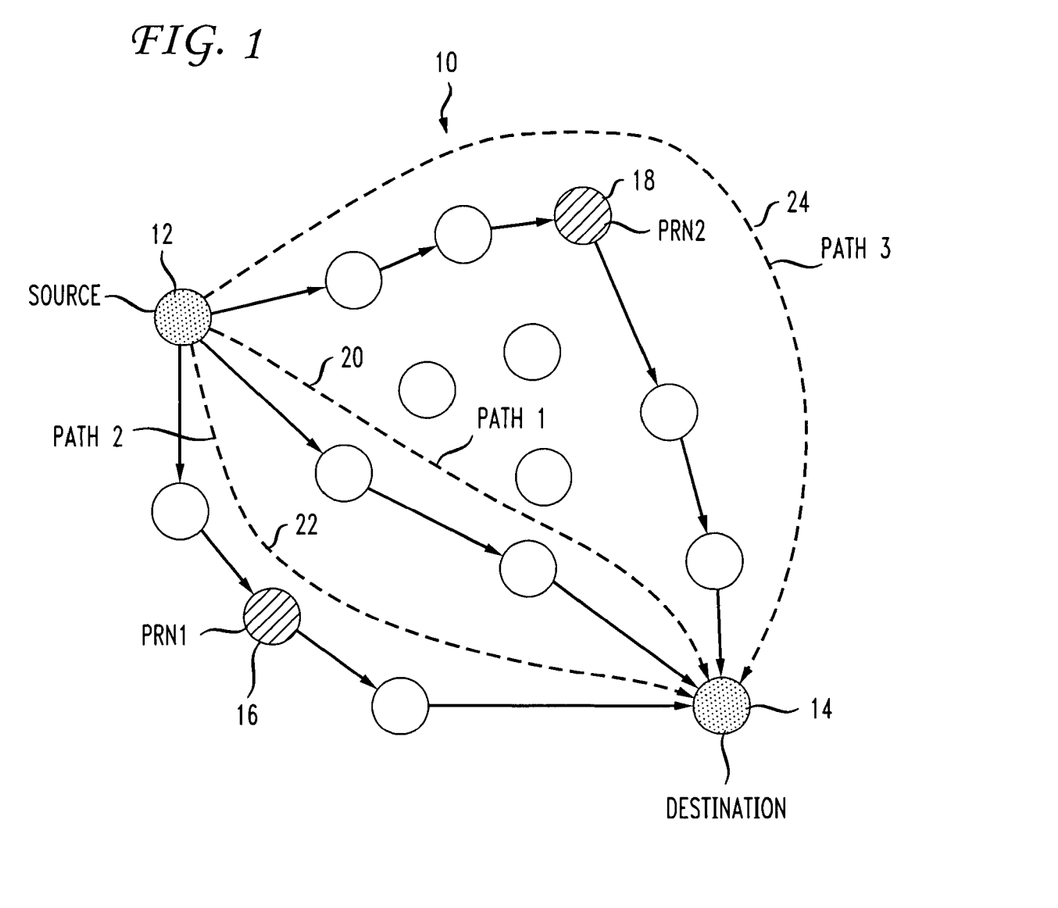
FIG. 1 illustrates a block diagram of an overlay network configured on top of a hybrid wireless mesh network.

Referring now to FIG. 1, an overlay network 10 configured on top of a hybrid mesh network capable of forwarding data packets is disclosed. The overlay network 10 includes a source node 12, a destination node 14, and relay nodes 16, 18, each of which is logically attached to the mesh network and communicate with each other. Preferably, nodes 10, 12, 14, 16 and 18 in the overlay network are connected by virtual or logical links, each of which corresponds to a path, perhaps through many physical links, in the underlying mesh network.

The overlay network 10 has its own packet management and routing methodology that supplements that of the hybrid wireless mesh network and thereby enhances the routing performed by the underlying mesh network. That is, the overlay network 10 provides access to nodes that normally are not accessible through the underlying mesh network given a particular set of circumstances. For example, referring now to FIG. 3, data packets in the underlying mesh network that are being transmitted from node 84 in Los Angeles would not ordinarily be rerouted through 86 in Miami to be received by node 82 in New York in the hybrid wireless mesh network. However, in the overlay network 10A, the path from node 84 in LA through node 86 in Miami to node 82 in New York is accessible and can be used to transmit the packets. In one preferred embodiment, the overlay network 10A detects a failure by measuring the quality of paths between its nodes 82, 84, 86, 88, 90. Once the failure is detected, the overlay network 10A preferably reroutes data packets through potential relay nodes or peer nodes 86, 88, which avoids transmitting the packets across the failure 80.

Figure 3:
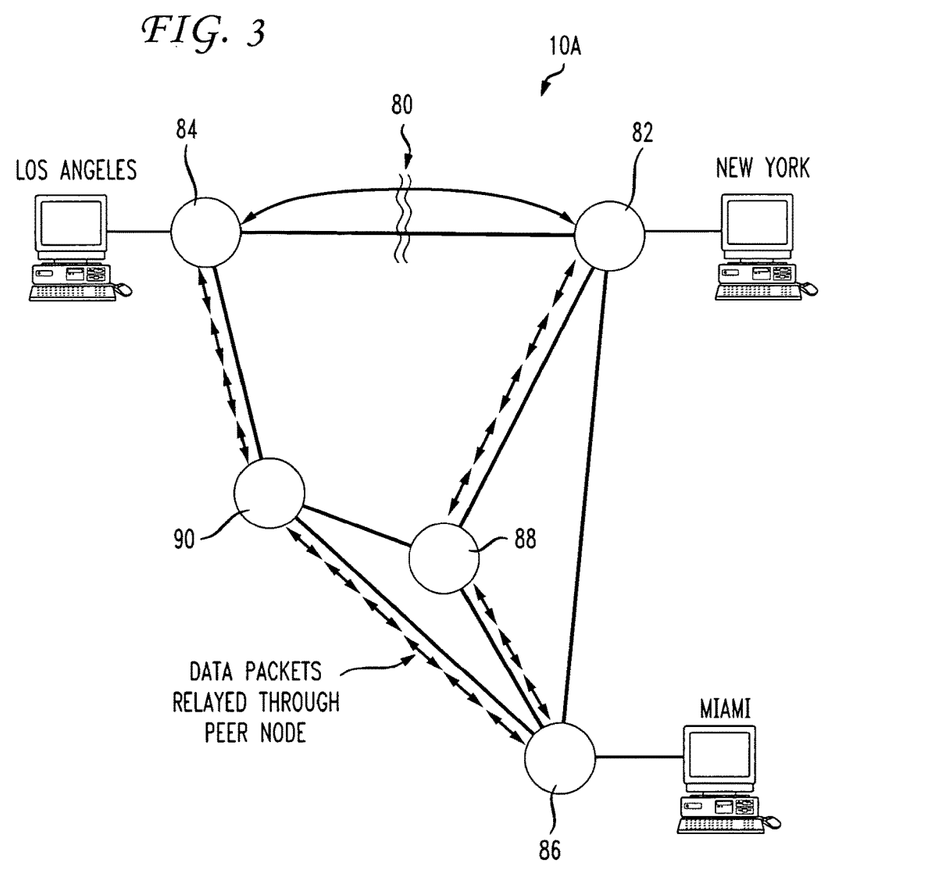
FIG. 3 illustrates a block diagram of an exemplary overlay network.

The actual communication links between nearby nodes are generally not shown in FIGS. 1 and 3. For communications between nodes that do not have a direct communication between them, intermediate HMN nodes located between these nodes are capable of conducting store-and-forward operation to forward data packets for them. The algorithm used for forwarding data packets from node to node over direct communication links within the HMN is hereafter referred to as the "native" data forwarding algorithm of the HMN. Examples of native data forwarding algorithms include Ethernet's spanning tree protocol, AD Hoc On Demand Distance Vector (AODV) Routing (RFC 3561), Optimized Link State Routing Protocol (RFC 3626), Topology Dissemination Based on Reverse-Path Forwarding (TBRPF)(RFC 3684), Dynamic Source Routing Protocol (DSR) (RFC 4728), etc.

Referring back to FIG. 1, in one preferred embodiment, the source node 12 can stream data packets to the destination node 14 using a direct path 20. Preferably, the source node 12 utilizes the native data forwarding algorithm included in the network 10. The source node 12 also can identify secondary paths 22, 24 for sending data packets to selected potential relay nodes (PRNs) 16, 18. PRNs 16, 18 then relay these data packets to the destination node 14. In one preferred embodiment, each data path includes two segments, one from the source node 12 to each relay node 16, 18 and another from each relay node 16, 18 to the destination node 14.

In one preferred embodiment, the PRNs 16, 18 are preconfigured. They can be either dedicated nodes connected to different parts of the mesh network, or mesh nodes that are configured to be relay nodes at the same time.

In one preferred embodiment, the source node 12 identifies PRNs 16, 18 using a peer-to-peer method. Preferably, each PRN 16, 18 maintains a list of preconfigured potential relay nodes using either a localized (radius limited) discovery protocol or other well known service. Preferably, the source node 12 uses the same method to discover its initial group of potential relay nodes as the potential relay nodes use to discover other potential relay nodes to construct relay paths 22 and 24.

In one preferred embodiment, to identify PRNs 16 and 18 the source node 12 accesses a centralized directory server on the network that maintains a list of pre-configured PRNs embedded in the WMN. The PRN entries listed on the directory server can be entered manually or automatically through PRN reporting facilities.

In another preferred embodiment, each PRN 16, 18 is configured to periodically send out broadcast messages with a limited Time To Live (TTL) value. This TTL value essentially limits the number of times that the message can be forwarded to additional relay nodes. As such, the PRNs 16, 18 can use this technique to limit broadcasting scope to discover other PRNs within a particular hop radius. Each PRN within the search radius then can exchange messages with the broadcasting source regarding the PRNs each has discovered. Preferably, the messages exchanged with the broadcasting source include an acknowledgement of the broadcast message. If no PRN is discovered within a radius, the searching PRN may increase its searching radius, the TTL value, to expand its search. Using this method, each PRN will gradually be aware of all the PRNs in the WMN. Preferably, the source node 12 determines available PRNs in the WMN 10 using the same method.

Once a new PRN is identified, the source node 12 preferably sends a special measurement packet toward the PRN which retransmits it to the destination node 14. Quality characteristics, such as end-to-end delay, jitter (variance of delay), throughput, hop count, packet loss rate, out of order rate, and the like, are taken during the forwarding of this packet. If the source node 12 is satisfied with the forwarding quality, the source node 12 activates the selected PRN to be used as RN and a new sub-data stream is created to go through it. As such, the source and destination nodes 12, 14, respectively, actively measure the quality of the transmission performed by each relay node 16, 18. The forwarding qualities of activated RNs are measured using the same means. If a particular relay node quality drops below a certain limit, the source node 12 can deactivate the particular relay node by simply stopping the transmission of send packets to this relay node.

In one preferred embodiment, the relaying of data packets is preferably accomplished with the use of double headers on these data packets. Preferably, the outer header is addressed to the RN and the inner header is addressed to the destination node. Initially, after the data packet is transmitted from the source node, HMN nodes preferably read the outer header and forward the data packets to the RN using native forwarding algorithm. Once the packet reaches the RN, the RN preferably strips out the outer header and reveals the inner header. This processed packet is then transmitted by the RN. This time, the HMN nodes read the inner header and forward the packet accordingly to the destination node.

In one preferred embodiment, to achieve communication technology diversity, relay nodes 16, 18 are configured in network clouds of different technologies. Advantageously, while some forwarding paths will go through one technology cloud, other paths will go through a different technology cloud, thus adding to network reliability.

For example, as shown in FIG. 1, the source node 12 starts and maintains a stream of data packets to a destination node 14. In the FIG. 1 example, there are two (2) PRNs 16, 18 embedded in the WMN 10. It will be appreciated by one skilled in the art that the disclosed embodiments are not limited to two PRNs and can include any number of PRNs. It will also be appreciated by one skilled in the art that the physical layer links between WMN nodes and the physical topology of the WMN are not shown in the example shown in FIG. 1.

As shown in FIG. 1, the source node 12 starts its data stream using the native data forwarding method of the WMN, e.g. shortest path routing, to send data to the destination node 14. This path is shown as Path-1 20 in FIG. 1.

If the source node 12 determines that the quality characteristic, such as throughput, of the stream is not satisfactory (e.g., does not meet a threshold value), the source node 12 identifies additional forwarding paths. Through the PRN discovery process discussed previously, the source node 12 preferably locates the two PRNs 16, 18 that are embedded in the WMN 10. Subsequently, the source node 12 creates a new sub-stream or portion of data packets, and sends the same towards PRN1 16. Upon PRN1 16 receiving any packet associated with this new traffic sub-stream, PRN1 16 forwards the packet towards the destination node 14. Forwarding from the source node 12 to PRN 16 and from PRN 16 to the destination node 14 is preferably accomplished using the native data forwarding method provided by the WMN 10. In this example, the new sub-stream or portion of data packets is shown as being forwarded along Path-2 22. Similarly, the source node 12 can construct an additional sub-stream or portion of data packets and stream the same through PRN2 18 along Path-3 24. Various techniques used by the source node 12 to create sub-streams are discussed in detail below.

In one preferred embodiment, upon a new sub-stream being transmitted, measurements are taken for the quality of the path over which the portion of data packets is being transmitted. Preferably, this is done through message passing between the source node 12 and the destination node 14 over the data packet path. The destination node 14 can then report the measurement results it has obtained back to the source node 12. For example, in one preferred embodiment, the source node 12 determines the hop count length of a particular path upon the destination node 14 sending back special report messages containing the TTL value of the packets the destination node 14 received from the source node 12. Since a TTL value of a packet preferably decrements by one (1) every time the packet is forwarded, by comparing the TTL value in these messages with the original TTL values the source node 12 established in the outgoing data packets for the destination node 14, the source node 12 determines the length of the path. Similarly, the destination node 14 may also measure the bit arrival rate of a sub-stream and report it back to the source node 12 using messages, thereby determining the level of throughput a particular sub-stream can deliver.

Using the measurement values, the source node 12 can determine the quality of a particular data path, and determine whether the path is efficient. For example, as shown in FIG. 1, upon the source node 12 determining that path-3 24 is actually six (6) hops long, much longer than the other two paths 20 and 22, the source node may deactivate path-3 24 and shut down its corresponding sub-stream.

In more complicated situations, although a newly added sub-stream may be high in quality, it can negatively impact existing sub-streams. For example, the new sub-stream may share links with existing sub-streams that results in diminishing bandwidth available to existing sub-streams. In these cases, it is the overall source node 12 to destination node 14 communication quality gain (or loss) resulting from adding the new sub-stream that determines if the new sub-stream should be maintained by the source node 12.

In some preferred embodiments, the source node 12 preferably determines whether to terminate an existing sub-stream if the quality of the sub-stream has degraded substantially, or a better alternative path has been found.

Partitioning and Merging of Sub-Streams

Figure 2:
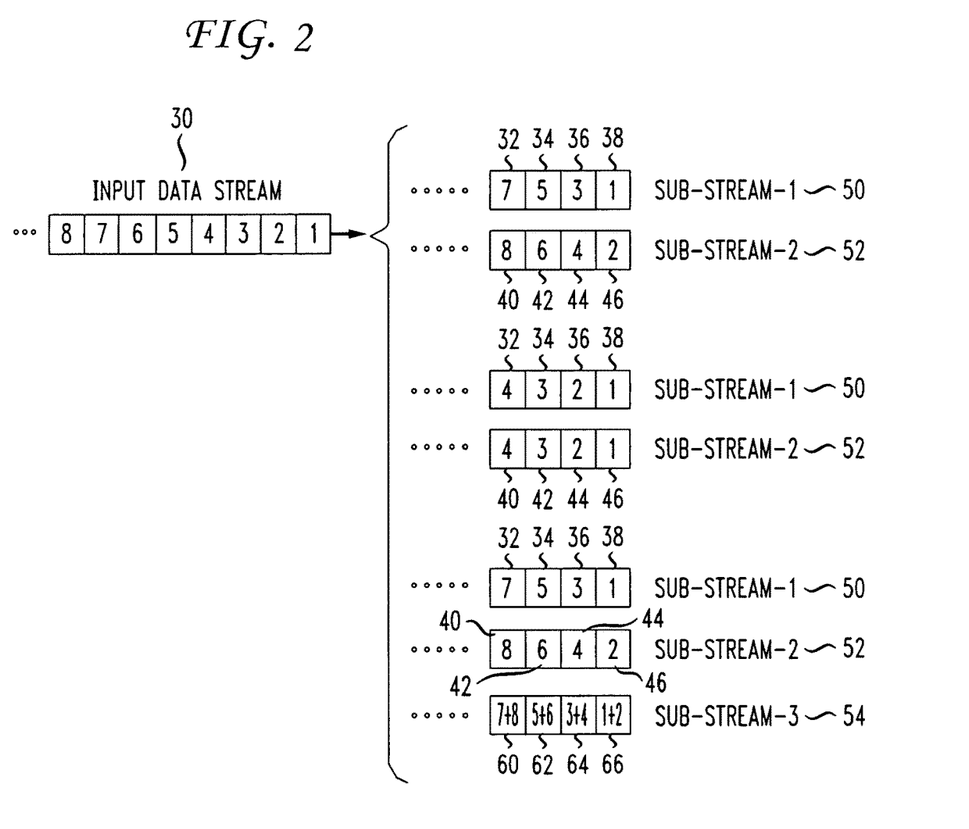
FIG. 2 illustrates partitioning data packets into data blocks.

Sub-streams may be constructed from a single input data stream. Referring now to FIG. 2, three methods of partitioning a single input packet stream are disclosed. As shown in FIG. 2, the source node 12 partitions an input stream of data packets 30 into blocks 32-46 that are tagged with sequential identifiers. In the FIG. 2 example, the sequential identifiers are numbered 1 through 8.

In one preferred embodiment, the source node 12 preferably sends odd numbered blocks 32-38 in sub-stream-1 50 and even numbered blocks 40-46 in sub-stream-2 52. At the destination node 14, the received blocks over both sub-streams 50, 52 are merged together in sequence to reconstruct the input data stream 30. One advantage of this method is that it can increase data stream throughput throughout the network 10.

In another preferred embodiment, the source node duplicates each of the blocks 32-46 and sends one copy over each sub-stream 50, 52. At the receiving end, duplicated blocks are dropped by the destination node 14. Advantageously, by sending duplicate packets over various sub-streams, data streaming is more robust as any packet loss on one sub-stream does not interrupt the final outcome as long as its duplicated copy arrives at the destination node 14 over a different sub-stream.

Packet level forward error correction techniques can also be integrated into either method. For example, as shown in FIG. 2, in one preferred embodiment, the source node 12 partitions the input stream of data packets 30 into blocks 32-46 that are tagged with sequential identifiers. Next, the source node 12 constructs sub-stream-1 50 using the odd numbered blocks 32-38 and constructs sub-stream-2 52 using the even numbered blocks 40-46. Next, the source node 12 creates a third sub-stream-3 54 that add redundant data to its blocks such that the destination node 14 can detect and correct errors without the need to ask the source node 12 to retransmit the stream. For example, as shown in FIG. 2, the first block 66 of sub-stream-3 54 includes the sequential identifier sum of the first block 38 of sub-stream-1 50 and the first block 46 of sub-stream-2 52. Similarly, the second block 64 of sub-stream-3 54 includes the sequential identifier sum of the second block 36 of sub-stream 1 50 and second block 44 of sub-stream2 52. As such, forward error correction coding with different coding rates can be used to build packets for sending in sub-streams.

Preferably, the destination node 14 maintains a reasonably sized buffer to store data packets arriving from different paths and the processing of sub-streams corresponds to the sub-stream creation configuration, namely aggregation, filtering for unique packets, or forward error correction.

A number of embodiments have been described. Nevertheless, it will be understood that various modifications may be made without departing from the spirit and scope of the disclosed embodiments. For example, dedicated servers or virtual servers associated with non-transitory computer-readable medium, collectively remote servers, may provide remote desktops and be organized or contained in various ways, and reside on multiple computers. Also, the steps described above may be modified in various ways or performed in a different order than described above, where appropriate. Accordingly, alternative embodiments are within the scope of the following claims.

What is claimed is:

1. A method of transferring data in a hybrid virtual mesh network, the method comprising:
   dividing, using a source node, data blocks into a first set of data blocks and a second set of data blocks based on an identifier, the data blocks being tagged with the identifier;
   selecting, using the source node, a potential relay node associated with an overlay virtual network, the overlay virtual network being associated with the hybrid virtual mesh network, the potential relay node providing a first path between the source node and a destination node, the first path being distinct from a second path, the potential relay node not being included in the second path;

transmitting, using the source node, the first set of data blocks to the destination node using the first path and the second set of data blocks to the destination node using the second path;

transmitting, using the source node, a third set of data blocks to the destination node, the third set of data blocks being a duplicate of the first set of data blocks;

deleting, using the destination node, a dropped data block from the third set of data blocks, the dropped data block being duplicated in the first set of data blocks; and merging, using the destination node, the first set of data blocks with the third set of data blocks, at least one of the first path and the second path comprising a virtual link.

2. The method of claim 1, further comprising:
comparing a value of a forwarding quality characteristic with a predetermined value, the forwarding quality characteristic being associated with the first path; and
identifying a third path based on comparing the value of the forwarding quality characteristic with the predetermined value, the third path comprising a virtual link.

3. The method of claim 1, wherein at least one of the data blocks comprises an outer head and an inner header, the outer header being addressed to the potential relay node, the inner header being addressed to the destination node.

4. The method of claim 1, further comprising:
identifying, using a virtual server, the potential relay node; and
maintaining, by the virtual server, a list of potential relay nodes associated with the hybrid virtual mesh network.

5. The method of claim 1, further comprising:
transmitting a first message from the source node to a plurality of network nodes, the first message comprising a time-to-live value, the time-to-live value representing a maximum quantity of allowable transmissions of the first message to the plurality of network nodes; and
transmitting a second message between the source node, potential relay node, and plurality of network nodes, the second message comprising an acknowledgement of the first message.

6. The method of claim 1, further comprising transmitting the data blocks using at least one of packet level forward error correction, spanning tree protocol, ad hoc on demand distance vector routing, optimized link state routing protocol, topology dissemination based on reverse-path forwarding, and dynamic source routing protocol.

7. The method of claim 1, wherein selecting the potential relay node further comprises:
transmitting a first message from the potential relay node to a plurality of network nodes, the first message comprising a time-to-live value, the time-to-live value representing a maximum quantity of allowable transmissions of the first message to the plurality of network nodes; and
transmitting a second message between the potential relay node and plurality of network nodes, the second message comprising an acknowledgement of the first message.

8. A communication system comprising:
a source node operatively coupled to a hybrid virtual mesh network;
a destination node operatively coupled to the hybrid virtual mesh network; and
an overlay virtual network associated with the hybrid virtual mesh network, the overlay virtual network comprising a processing device, the processing device performing operations comprising:
dividing, using the source node, data blocks into a first set of data blocks and a second set of data blocks based on an identifier, the data blocks being tagged with the identifier;
selecting, using the source node, a potential relay node associated with an overlay virtual network, the overlay virtual network being associated with the hybrid virtual mesh network, the potential relay node providing a first path between the source node and a destination node, the first path being distinct from a second path, the potential relay node not being included in the second path;
transmitting, using the source node, the first set of data blocks to the destination node using the first path and the second set of data blocks to the destination node using the second path;
transmitting, using the source node, a third set of data blocks to the destination node, the third set of data blocks being a duplicate of the first set of data blocks;
deleting, using the destination node, a dropped data block from the third set of data blocks, the dropped data block being duplicated in the first set of data blocks; and
merging, using the destination node, the first set of data blocks with the third set of data blocks, at least one of the first path and the second path comprising a virtual link.

9. The communication system of claim 8, wherein the operations further comprise:
comparing, by the source node, a value of a forwarding quality characteristic with a predetermined value, the forwarding quality characteristic being associated with the first path; and
identifying, by the source node, a third path for transmission of data blocks based on comparing the value of the forwarding quality characteristic with the predetermined value, the third path comprising a virtual link.

10. The communication system of claim 8, wherein at least one of the data blocks comprises an outer head and an inner header, the outer header being addressed to the potential relay node, the inner header being addressed to the destination node.

11. The communication system of claim 8, wherein the operations further comprise:
identifying, by the source node, a potential relay node using a virtual server; and
maintaining, by the virtual server, a list of potential relay nodes associated with the hybrid virtual mesh network.

12. The communication system of claim 8, wherein the operations further comprise:
transmitting a first message from the source node to a plurality of network nodes, the first message comprising a time-to-live value, the time-to-live value representing a maximum quantity of allowable transmissions of the first message to the plurality of network nodes; and transmitting, by the source node and relay node, a second message between the source node, potential relay node, and plurality of network nodes, the second message comprising an acknowledgement of the first message.

13. The communication system of claim 8, wherein the operations further comprise transmitting the data blocks using at least one of packet level forward error correction, spanning tree protocol, ad hoc on demand distance vector routing, optimized link state routing protocol, topology dissemination based on reverse-path forwarding, and dynamic source routing protocol.

14. The communication system of claim 8, wherein the operations further comprise:
   transmitting a first message from the potential relay node to a plurality of network nodes, the first message comprising a time-to-live value, the time-to-live value representing a maximum quantity of allowable transmissions of the first message to the plurality of network nodes; and
   exchanging, by the source node and relay node, a second message between potential relay node and plurality of network nodes, the second message comprising an acknowledgement of the first message.

15. A non-transitory computer-readable medium storing instructions that, when executed by a processing device, transfer data in a hybrid virtual mesh network by performing operations comprising:
   dividing, using a source node, data blocks into a first set of data blocks and a second set of data blocks based on an identifier, the data blocks being tagged with the identifier;
   selecting, using the source node, a potential relay node associated with an overlay virtual network, the overlay virtual network being associated with the hybrid virtual mesh network, the potential relay node providing a first path between the source node and a destination node, the first path being distinct from a second path, the potential relay node not being included in the second path;
   transmitting, using the source node, the first set of data blocks to the destination node using the first path and the second set of data blocks to the destination node using the second path;
   transmitting, using the source node, a third set of data blocks to the destination node, the third set of data blocks being a duplicate of the first set of data blocks;
   deleting, using the destination node, a dropped data block from the third set of data blocks, the dropped data block being duplicated in the first set of data blocks; and
   merging, using the destination node, the first set of data blocks with the third set of data blocks, at least one of the first path and the second path comprising a virtual link.

16. The non-transitory computer-readable medium of claim 15, wherein at least one of the data blocks comprises an outer header and an inner header, the outer header being addressed to the potential relay node, the inner header being addressed to the destination node.

17. The non-transitory computer-readable medium of claim 15, wherein the operations further comprise:
   identifying, using a virtual server, the potential relay node; and
   maintaining, by the virtual server, a list of potential relay nodes associated with the hybrid virtual mesh network.

18. The non-transitory computer-readable medium of claim 15, wherein the operations further comprise:
   transmitting a first message from the source node to a plurality of network nodes, the first message comprising a time-to-live value, the time-to-live value representing a maximum quantity of allowable transmissions of the first message to the plurality of network nodes;
   transmitting a second message between the source node, potential relay node, and plurality of network nodes, the second message comprising an acknowledgement of the first message.

19. The non-transitory computer-readable medium of claim 15, wherein the operations further comprise transmitting the data blocks using at least one of packet level forward error correction, spanning tree protocol, ad hoc on demand distance vector routing, optimized link state routing protocol, topology dissemination based on reverse-path forwarding, and dynamic source routing protocol.

20. The non-transitory computer-readable medium of claim 15, wherein the operations further comprise:
   transmitting a first message from the potential relay node to a plurality of network nodes, the first message comprising a time-to-live value, the time-to-live value representing a maximum quantity of allowable transmissions of the first message to the plurality of network nodes; and
   transmitting a second message between the potential relay node and plurality of network nodes, the second message comprising an acknowledgement of the first message.

* * * * *